United States Patent [19]
Ohta et al.

[11] Patent Number: 5,737,105
[45] Date of Patent: Apr. 7, 1998

[54] OPTICAL REPEATER

[75] Inventors: Kenji Ohta; Mitsuo Kitamura, both of Kawasaki, Japan

[73] Assignee: Fujitsu Limited, Kanagawa, Japan

[21] Appl. No.: 617,399

[22] Filed: Mar. 18, 1996

[30] Foreign Application Priority Data

Jun. 27, 1995 [JP] Japan ................ 7-160502

[51] Int. Cl.$^6$ ........................... H04B 10/17
[52] U.S. Cl. ................ 359/179; 359/174; 359/341; 359/347
[58] Field of Search ............. 359/179, 174, 359/333, 341, 346, 347, 349; 385/24, 39, 47

[56] References Cited

U.S. PATENT DOCUMENTS

| | | | |
|---|---|---|---|
| 4,887,309 | 12/1989 | Andersson et al. | 359/110 |
| 4,972,513 | 11/1990 | Mochizuki et al. | 359/179 |
| 5,481,390 | 1/1996 | Naito | 359/110 |
| 5,581,397 | 12/1996 | Maki et al. | 359/341 |

*Primary Examiner*—Leslie Pascal
*Attorney, Agent, or Firm*—Helfgott & Karas, P C

[57] ABSTRACT

An optical repeater is provided between terminal stations and amplifies optical signals that have entered via optical fibers in upward and downward directions and outputs the amplified optical signals to optical fibers in respective directions. The optical fiber on the output side of an upward optical amplifier and the optical fiber on the output side of a downward optical amplifier are optically coupled, with a prescribed loss, by a photocoupler. The upward optical signal is looped back to the optical fiber in the downward direction upon being attenuated by, say, 40 dB via the photocoupler, and the downward optical signal is looped back to the optical fiber in the upward direction upon being attenuated by, say, 40 dB, via the photocoupler.

5 Claims, 8 Drawing Sheets

OPTICAL REPEATER

BACKGROUND OF THE INVENTION

This invention relates to an optical repeater provided between terminal stations for amplifying optical signals, which have entered in upward and downward directions via respective optical fibers, and outputting the amplified optical signals to the optical fibers in the respective directions. More particularly, the invention relates to an optical repeater so adapted that monitoring of the gain of an optical repeater and detection of a fault in an optical transmission line can be performed through a simple arrangement.

In an optical system in which optical signals are sent between terminal stations using optical fibers, the optical signals are attenuated by propagation distance. For this reason, optical repeaters are placed at prescribed locations in an optical transmission line to amplify and transmit the optical signals. FIG. 9 is a diagram showing the construction of an optical transmission system. The system includes terminal stations 1, 2 for sending and receiving optical signals, an optical fiber 3 in the upward direction, an optical fiber 4 in the downward direction, and N-number of repeater stations $5_1$~$5_N$ provided between the terminal stations. The optical repeaters $5_1$~$5_N$ have optical amplifiers $6_1$~$6_N$, $7_1$~$7_N$, respectively, for the upward and downward directions, respectively. The optical amplifiers $6_1$~$6_N$, $7_1$~$7_N$ amplify optical signals that have entered via the upward and downward optical fibers 3, 4, respectively, and output the amplified optical signals to upward and downward optical fibers 3, 4, respectively.

In an optical transmission system of this kind, it is necessary to promptly detect and deal with the occurrence of failures and the locations of the failures in order to improve service. This requirement is especially great in undersea transmission systems in which optical transmission lines are laid along the bottom of the sea. To satisfy this requirement, the terminal stations function to monitor the gain of each optical repeater and detect the particular section in which a failure has occurred. In addition, each repeater is also so adapted that the terminal stations can execute the above-mentioned functions.

FIG. 10 is a diagram showing the construction of a conventional repeater having loop-back paths. Shown in FIG. 10 are the optical fiber 3 in the upward direction, the optical fiber 4 in the downward direction and an optical repeater 5 having an optical amplifier 6 in the upward direction, an amplifier 7 in the downward direction, and photocouplers 8, 9 having a prescribed optical coupling loss characteristic (attenuation on the order of −20 dB) for branching optical signals in the optical fibers on the output side of the corresponding optical amplifiers 6, 7. Numeral 10 denotes a first loop-back path for optically coupling one end of the photocoupler 8 and one end of the photocoupler 9, and numeral 11 denotes a second loop-back path for optically coupling another end of the photocoupler 9 and another end of the photocoupler 8.

The upward optical signal amplified by the optical amplifier 6 is attenuated 20 dB by the photocoupler 8, the attenuated optical signal is introduced to the loop-back path 10 and is then attenuated a further 20 dB by the photocoupler 9 before being looped back to the downward optical fiber 4 (see the dashed line in FIG. 10). Similarly, the downward optical signal amplified by the optical amplifier 7 is attenuated 20 dB by the photocoupler 9, the attenuated optical signal is introduced to the loop-back path 11 and is then attenuated a further 20 dB by the photocoupler 8 before being looped back to the upward optical fiber 3 (see the dot-and-dash line in FIG. 10). The looped-back optical signals attenuated by 40 dB return to the terminal stations which then proceed to check the levels of the optical signals, thereby judging whether the optical amplifiers 6, 7 of repeater 5 are operating normally.

FIG. 11 is a diagram showing the construction of a conventional repeater having loop-back paths and a fault-point detection path (OTDR path: Optical Time Domain Reflectometry Path). Shown in FIG. 11 are the optical fiber 3 in the upward direction, the optical fiber 4 in the downward direction and the optical repeater 5 having the optical amplifier 6 in the upward direction, the amplifier 7 in the downward direction and the first and second photocouplers 8, 9 having a prescribed optical coupling loss characteristic (attenuation on the order of −10 dB) for branching optical signals in the optical fibers on the output side of the corresponding optical amplifiers 6, 7. Numeral 12 denotes a third photocoupler having a prescribed optical coupling loss characteristic (attenuation on the order of −20 dB). The third photocoupler 12 has a first end optically coupled to an end 8a in the branch path of the first photocoupler 8, and a second end that is terminated so that reflection will not occur. Numeral 13 denotes a fourth photocoupler having a prescribed optical coupling loss characteristic (attenuation on the order of −20 dB). The fourth photocoupler 13 has a first end optically coupled to an end 9a in the branch path of the second photocoupler 9, and a second end that is terminated so that reflection will not occur. The photocoupler 12 has a third end optically coupled to a second end 9b of the photocoupler 9, and the photocoupler 13 has a third end optically connected to a second end 8b of the photocoupler 8. A fourth end of the photocoupler 12 and a fourth end of the photocoupler 13 are optically coupled to each other.

The upward optical signal amplified by the optical amplifier 6 is attenuated 10 dB by the photocoupler 8, the attenuated optical signal is introduced to the photocoupler 12, this optical signal is attenuated 20 dB by the photocoupler 12 and introduced to the photocoupler 9, and the optical signal is attenuated a further 10 dB by the photocoupler 9 before being looped back to the downward optical fiber 4. In other words, the upward optical signal is attenuated by a total of 40 dB through the path indicated by the dashed line and is then looped back to the downward optical fiber. Similarly, the downward optical signal amplified by the optical amplifier 7 is attenuated 10 dB by the photocoupler 9, the attenuated optical signal is introduced to the photocoupler 13, this optical signal is attenuated 20 dB by the photocoupler 13 and introduced to the photocoupler 8, and the optical signal is attenuated a further 10 dB by the photocoupler 8 before being looped back to the upward optical fiber 3. In other words, the downward optical signal is attenuated by a total of 40 dB and is then looped back to the upward optical fiber 3. The looped-back optical signals attenuated by 40 dB return to the terminal stations which then proceed to check the levels of the optical signals, thereby judging whether the optical amplifiers 6, 7 of repeater 5 are operating normally.

Rayleigh scattered light produced by the upward optical fiber 3 travels through the optical fiber 3 in the direction indicated by the solid arrow, reaches the first photocoupler 8 where it is attenuated by 10 dB and then arrives at the second photocoupler 9 via a fault-point detection path (OTDR path: Optical Time Domain Reflectometry Path) 14. The light is attenuated 10 dB by the photocoupler 9 and the attenuated light is inserted into the downward optical fiber 4 so as to be returned to the terminal station. Similarly, Rayleigh scattered light produced by the downward optical fiber 4 travels in the opposite direction through the optical fiber 4, reaches the second photocoupler 9 where it is attenuated by 10 dB and then arrives at the first photocoupler 8 via the OTDR path 14. The light is attenuated 10 dB by the photocoupler 8 and the attenuated light is inserted into the upward optical fiber 3 so as to be returned to the terminal station.

The power of the Rayleigh scattered light returned to the terminal station is as indicated by the solid line in FIG. 12 if a failure has not occurred in the optical transmission line. More specifically, since the optical signal is enlarged by amplification in each of repeater stations $5_{i-1}$, $5_i$, $5_{i+1}$, the power of the Rayleigh scattered light also indicates a large value in the vicinity of each repeater. In addition, the power of the Rayleigh scattered light decreases with the attenuation of the optical signal, which attenuation is dependent upon propagation distance. However, when a failure (indicated by the "x" mark in FIG. 12) occurs in an optical fiber owing to, say, breakage of the fiber, the Rayleigh scattered light stops returning to the terminal station from the location of the fault, as indicated by the dot-and-dash line in FIG. 12. Accordingly, the terminal station generates an optical signal and monitors whether Rayleigh scattered light has returned. If Rayleigh scattered light cannot be detected since a prescribed length of time has elapsed after transmission of the optical signal, the terminal station is capable of detecting a failure on the fiber and the location of the failure based upon the fact that the failure occurred at a location conforming to the elapsed time.

Thus, in accordance with the optical repeaters shown in FIGS. 10 and 11, optical signals are inserted into a pair of lines via loop-back paths and are returned to the terminal stations. This makes it possible to monitor the operation of optical repeater stations through a comparatively simple arrangement. Further, with the optical repeater of FIG. 11, the location at which a failure has occurred can be detected by inserting Rayleigh scattered light into a pair of lines via an OTDR path and returning the light to the terminal stations.

However, since a large number of photocouplers are required in the conventional repeaters, a problem which arises is higher cost. In addition, the larger the number of couplers, the greater the decline in reliability.

SUMMARY OF THE INVENTION

Accordingly, an object of the present invention is to provide a low-cost, highly reliable optical repeater having functions equivalent to those of the prior art, the number of couplers being reduced by utilizing reflection.

In accordance with the present invention, the foregoing object is attained by providing an optical repeater comprising a first photocoupler, which has a prescribed optical coupling loss characteristic, for optically coupling an optical fiber on an output side of an optical amplifier in an upward direction and an optical fiber on an output side of an optical amplifier in a downward direction, and a loop-back path for looping back an optical signal in the upward direction to the optical fiber in the downward direction via the first photocoupler, and looping back an optical signal in the downward direction to the optical fiber in the upward direction via the first photocoupler.

Further, in accordance with the present invention, the foregoing object is attained by providing an optical repeater comprising a first photocoupler, which has a prescribed optical coupling loss characteristic, provided in an optical fiber on an output side of an optical amplifier in an upward direction, a first reflector, which has a prescribed reflection loss characteristic, obtained by subjecting one end of a branch path of the first photocoupler to a reflective treatment, a second photocoupler, which has a prescribed optical coupling loss characteristic, provided in an optical fiber on an output side of an optical amplifier in a downward direction, a second reflector, which has a prescribed reflection loss characteristic, obtained by subjecting one end of a branch path of the second photocoupler to a reflective treatment, and an optical path for coupling another end of the branch path of the first photocoupler and another end of the branch path of the second photocoupler.

Further, in accordance with the present invention, the foregoing object is attained by providing a first reflector, provided on an output side of an optical amplifier in an upward direction, obtained by applying a reflective treatment so as to attenuate and reflect an optical signal that has entered from the opposite direction, a second reflector, provided on an output side of an optical amplifier in a downward direction, obtained by applying a reflective treatment so as to attenuate and reflect an optical signal that has entered from the opposite direction, and a first photocoupler, which has a prescribed optical coupling loss characteristic, for optically coupling an optical fiber on a reflecting side of the first reflector and an optical fiber on a reflecting side of the second reflector.

Other features and advantages of the present invention will be apparent from the following description taken in conjunction with the accompanying drawings.

DESCRIPTION OF THE PREFERRED EMBODIMENTS

(A) First Embodiment of the Invention

Figure 1:
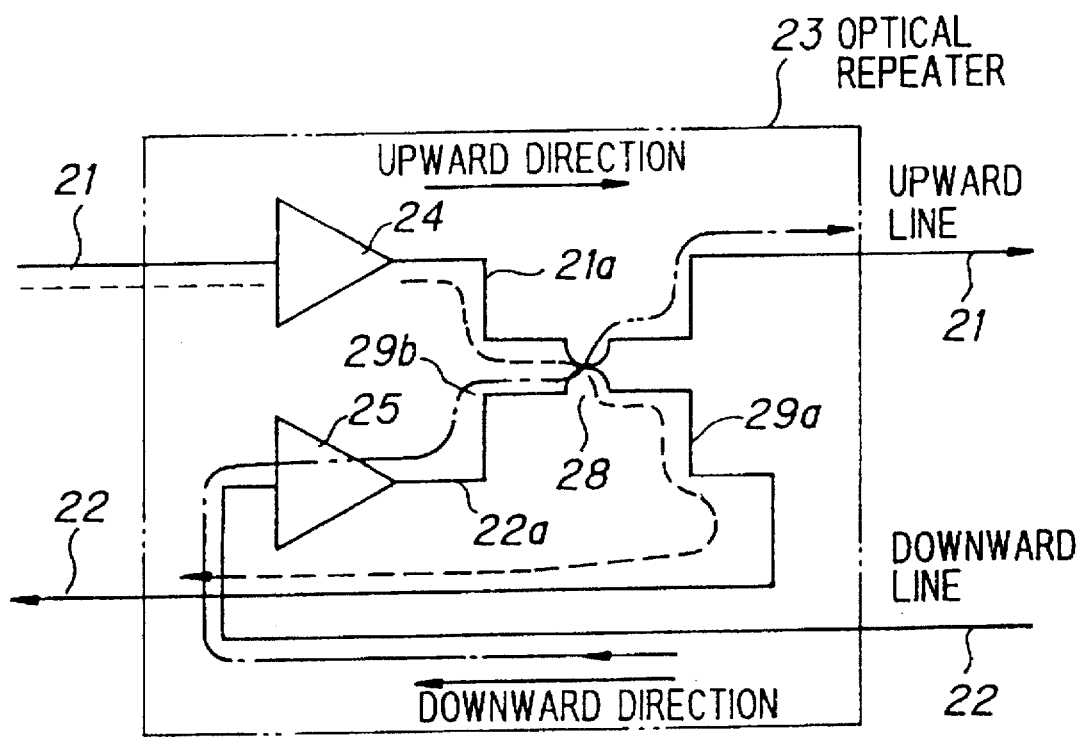
FIG. 1 is a diagram showing the construction of a first embodiment of the present invention.
Figure 2:
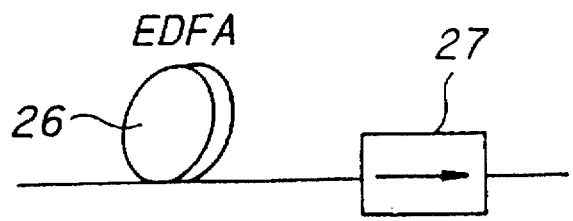
FIG. 2 is a diagram showing the construction of an optical amplifier.

FIG. 1 is a diagram showing the construction of an optical repeater 23 according to the present invention and having loop-back paths. Numerals 21, 22 denote optical fibers in the upward and downward directions, respectively. The optical repeater 23 includes an optical amplifier 24 in the upward direction and an optical amplifier 25 in the downward direction, each of which has an EDFA (erbium-doped fiber amplifier) 26 and an optical isolator 27, which passes light in one direction only, as shown in FIG. 2. The optical repeater further includes a photocoupler 28, which has a prescribed optical coupling loss characteristic (attenuation on the order of −40 dB), for optically coupling an optical fiber 21a on the output side of the optical amplifier 24 in the upward direction and an optical fiber 22a on the output side of the optical amplifier 25 in the downward direction. A loop-back path 29a loops back an upward optical signal to the optical fiber 22 in the downward direction via the photocoupler 28, and a loop-back path 29b loops back a downward optical signal to the optical fiber 21 in the upward direction via the photocoupler 28.

In accordance with the first embodiment, the optical signal in the upward direction is looped back to the optical fiber 22 in the downward direction upon being attenuated by, say, 40 dB via the photocoupler 28, and the optical signal in the downward direction is looped back to the optical fiber 21 in the upward direction upon being attenuated by, say, 40 dB via the photocoupler 28. The looped-back optical signals attenuated by 40 dB return to respective terminal stations which then proceed to check the levels of the optical signals, thereby judging whether the optical amplifiers 24, 25 of repeater 23 are operating normally.

The first embodiment may be summarized as follows: In the optical repeater 23 provided between terminal stations for amplifying optical signals that have entered via the optical fibers 21, 22 in the upward and downward directions and outputting the amplified optical signals to optical fibers in respective directions, the optical fiber 21a on the output side of the upward optical amplifier 24 and the optical fiber 22a on the output side of the downward optical amplifier 25 are optically coupled, with application of a prescribed loss, by the photocoupler 28. Loop-pack paths are formed in such a manner that the upward optical signal is looped back to the optical fiber 22 in the downward direction upon being attenuated by, say, 40 dB via the photocoupler 28, and the downward optical signal is looped back to the optical fiber 21 in the upward direction upon being attenuated by, say, 40 dB via the photocoupler 28. By adopting such an arrangement, loop-back paths can be formed merely by providing a single photocoupler. This makes it possible to lower the cost and raise the reliability of the optical repeater.

(B) Second Embodiment of the Invention

Figure 3:
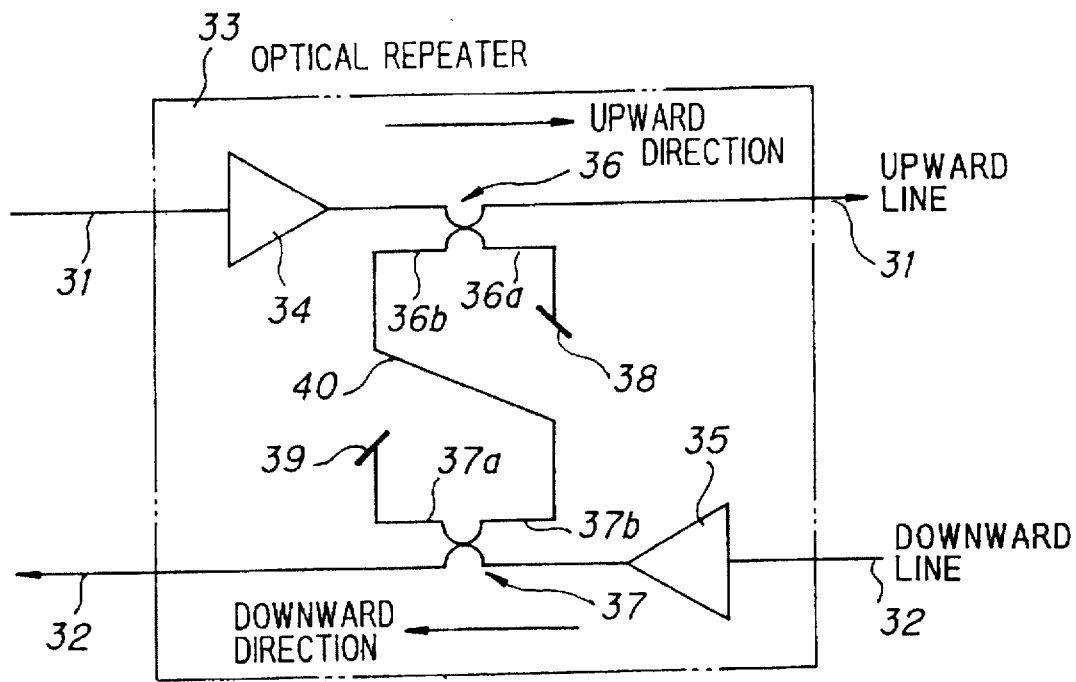
FIG. 3 is a diagram showing the construction of a second embodiment of the present invention.

FIG. 3 is a diagram showing the construction of an optical repeater 33 according to the present invention and having loop-back paths and OTDR paths. Numerals 31, 32 denote optical fibers in the upward and downward directions, respectively. The optical repeater 33 includes an optical amplifier 34 in the upward direction and an optical amplifier 35 in the downward direction. These are similar to the corresponding components in FIG. 2. The optical repeater 33 further includes a first photocoupler 36, which has a prescribed optical coupling loss characteristic (e.g., a 10-dB attenuation characteristic), provided in the optical fiber on the output side of the optical amplifier 34 in the upward direction, a second photocoupler 37, which has a prescribed optical coupling loss characteristic (e.g., a 10-dB attenuation characteristic), provided in the optical fiber on the output side of the optical amplifier 35 in the downward direction, a first reflector 38 obtained by subjecting an end 36a of a branch path of the first photocoupler 35 to a reflective treatment in such a manner that entrant light is attenuated by, say, −20 dB and reflected, a second reflector 39 obtained by subjecting an end 37a of a branch path of the second photocoupler 37 to a reflective treatment in such a manner that entrant light is attenuated by, say, −20 dB and reflected, and an optical path 40 for coupling another end 36b of the branch path of the first photocoupler 36 and another end 37b of the branch path of the second photocoupler 37. The optical path 40 constructs loop-back paths and OTDR paths. The first and second reflectors 38, 39 are formed by an end-face treatment or thin-film treatment to stably attenuate entrant light by −20 dB and reflect the light.

Figure 4A:
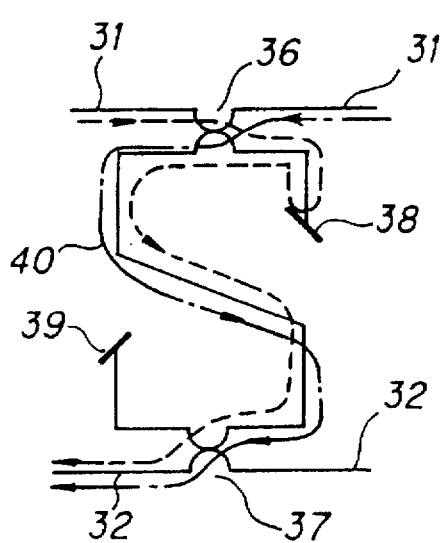
FIGS. 4A and 4B are diagrams for describing the operation of the second embodiment.
Figure 4B:
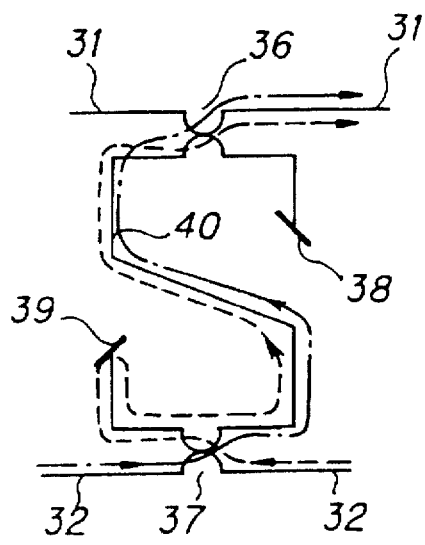

As indicated by the dashed line in FIG. 4A, the upward optical signal arrives at the first reflector 38 upon being attenuated by 10 dB via the first photocoupler 36, the optical signal is attenuated by 20 dB and reflected by the first reflector 38, and the reflected light is attenuated by 10 dB via the second photocoupler 37, for a total attenuation of 40 dB, and is looped back to the downward optical fiber 32. Further, as indicated by the dashed line in FIG. 4B, the downward optical signal arrives at the second reflector 39 upon being attenuated by 10 dB via the second photocoupler 37, the optical signal is attenuated by 20 dB and reflected by the second reflector 39, and the reflected light is attenuated by 10 dB via the first photocoupler 36, for a total attenuation of 40 dB, and is looped back to the upward optical fiber 31. Thus, the paths indicated by the dashed lines in FIGS. 4A, 4B are loop-back paths.

The looped-back optical signals attenuated by 40 dB return to respective terminal stations which then proceed to check the levels of the optical signals, thereby judging whether the optical amplifiers 34, 35 of repeater 33 are operating normally.

As indicated by the dot-and-dash line in FIG. 4A, Rayleigh scattered light scattered by the upward optical fiber 31 on the output side is attenuated by 10 dB by each of the first and second photocouplers 36, 37, respectively, for a total of 20 dB of attenuation, and the attenuated light is inserted into the downward optical fiber 32 to be returned to the terminal station. Similarly, as indicated by the dot-and-dash line in FIG. 4B, Rayleigh scattered light scattered by the downward optical fiber 32 on the output side is attenuated by 10 dB by each of the second and first photocouplers 37, 36, respectively, for a total of 20 dB of attenuation, and the attenuated light is inserted into the upward optical fiber 31 to be returned to the terminal station. Thus, the paths indicated by the dot-and-dash lines in FIGS. 4A, 4B are OTDR paths.

Each terminal station monitors whether Rayleigh scattered light has returned. If Rayleigh scattered light cannot be detected a prescribed length of time after transmission of the optical signal, the terminal station is capable of detecting the location of the fault based upon the fact that the fault occurred at a location conforming to the elapsed time.

The second embodiment may be summarized as follows:

The optical fiber on the output side of the upward optical amplifier 34 in the optical repeater 33 is provided with the first photocoupler 36 having a prescribed optical coupling loss characteristic, and the optical fiber on the output side of the downward optical amplifier 35 in the optical repeater 33 is provided with the second photocoupler 37 having a prescribed optical coupling loss characteristic. The ends 36a, 37a of the branch paths of the first and second photocouplers 36, 37, respectively, are subjected to a reflective treatment so as to attenuate and reflect entrant light. Further, the other end 36b of the branch path in the first photocoupler 36 and the other end 37b of the branch path in the second photocoupler 37 are coupled.

By adopting this arrangement, the upward optical signal arrives at the first reflector 38 upon being attenuated by, say, 10 dB via the first photocoupler 36, the optical signal is attenuated by 20 dB and reflected by the first reflector 38, and the reflected light is attenuated by 10 dB via the second photocoupler 37, for a total attenuation of 40 dB, and is looped back to the downward optical fiber 32. Further, the downward optical signal arrives at the second reflector 39 upon being attenuated by, say, 10 dB via the second photocoupler 37, the optical signal is attenuated by 20 dB and reflected by the second reflector 39, and the reflected light is attenuated by 10 dB via the first photocoupler 36, for a total attenuation of 40 dB, and is looped back to the upward optical fiber 31.

Further, Rayleigh scattered light scattered by the upward optical fiber 31 on the output side is attenuated by 10 dB by each of the first and second photocouplers 36, 37, respectively, for a total of 20 dB of attenuation, and the attenuated light is inserted into the downward optical fiber 32. Similarly, Rayleigh scattered light scattered by the downward optical fiber 32 on the output side is attenuated by 10 dB by each of the second and first photocouplers 37, 36, respectively, for a total of 20 dB of attenuation, and the attenuated light is inserted into the upward optical fiber 31.

By adopting such an arrangement, loop-back paths and OTDR paths can be formed merely by providing the two photocouplers 36 and 37. This makes it possible to lower the cost and raise the reliability of the optical repeater.

(C) Third Embodiment of the Invention

Figure 5:
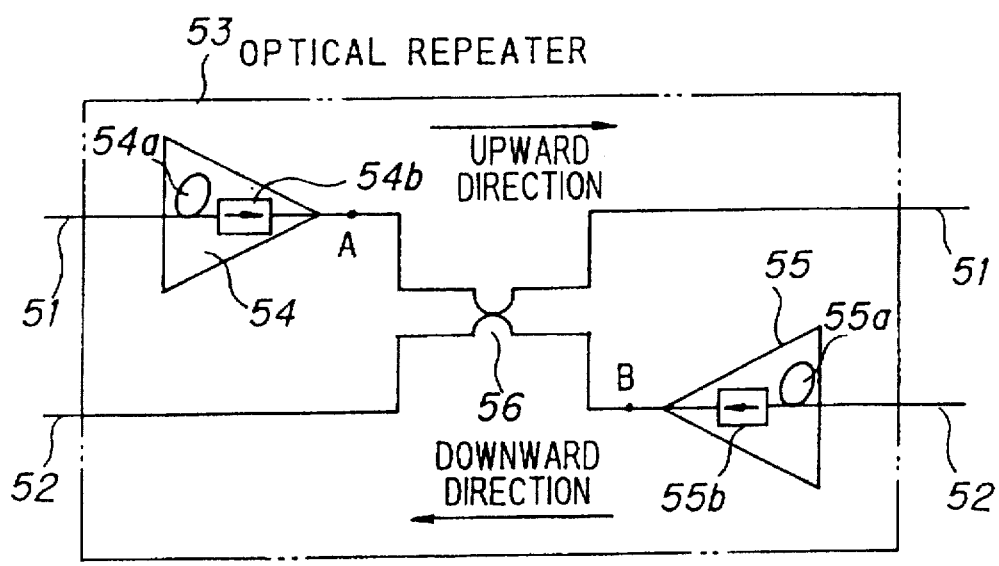
FIG. 5 is a diagram showing the construction of a third embodiment of the present invention.

FIG. 5 is a diagram showing another construction of an optical repeater according to the present invention and having loop-back paths and OTDR paths. Numerals 51, 52 denote optical fibers in the upward and downward directions, respectively. The optical repeater, indicated at 53, includes an optical amplifier 54 in the upward direction and an optical amplifier 55 in the downward direction. The optical amplifier 54 has an EDFA (erbium-doped fiber amplifier) 54a and an optical isolator 54b, which passes light in one direction only. Similarly, the optical amplifier 55 has an EDFA 55a and an optical isolator 55b, which passes light in one direction only. The optical repeater 53 further includes a photocoupler 56, which has a prescribed optical coupling loss characteristic (attenuation on the order of −20 dB), for optically coupling an optical fiber on the output side of the optical amplifier 54 in the upward direction and an optical fiber on the output side of the optical amplifier 55 in the downward direction. The optical isolators 54b, 55b are subjected to a reflective treatment in such a manner that light incident from the opposite direction will be attenuated on the order of −20 dB and reflected.

Figure 6:
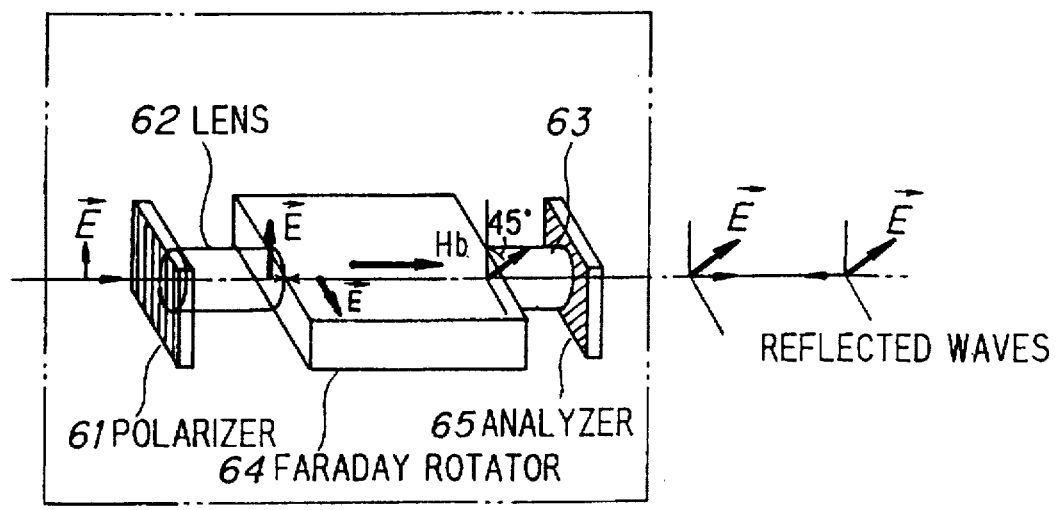
FIG. 6 is a diagram showing the construction of an optical isolator.

As shown in FIG. 6, each of the optical isolators 54b, 55b has a polarizer 61, lenses 62, 63, a Faraday rotator 64 and an analyzer 65. Vertically polarized waves incident from the left side in FIG. 6 pass unchanged through the polarizer 61 oriented in the same direction, and the waves impinge upon the Faraday rotator 64. A magnetic field Hb is applied to the Faraday rotator 64 in the direction indicated, whereby the plane of polarization of the rotator is rotated by 45°. The output side of the rotator has the analyzer 65 inclined at an angle of 45° so that the transmitted waves may pass through the analyzer. If light is reflected and returns with the same plane of polarization, the reflected waves are rotated by the Faraday rotator 64 through a further 45° to assume an orientation that is at right angles to the polarizer 61. As a result, the reflected waves are blocked by the polarizer 61 and do not return to the side on which the waves originally impinged. Accordingly, light is transmitted in only one direction and is not transmitted in the direction opposite this direction. Further, though an ordinary isolator is subjected to a reflective treatment so as to attenuate reflected light by 50 dB, the isolators of FIG. 5 are reflectively treated in such a manner that light incident from the left in FIG. 6 is attenuated by −20 dB and attenuated.

Figure 7A:
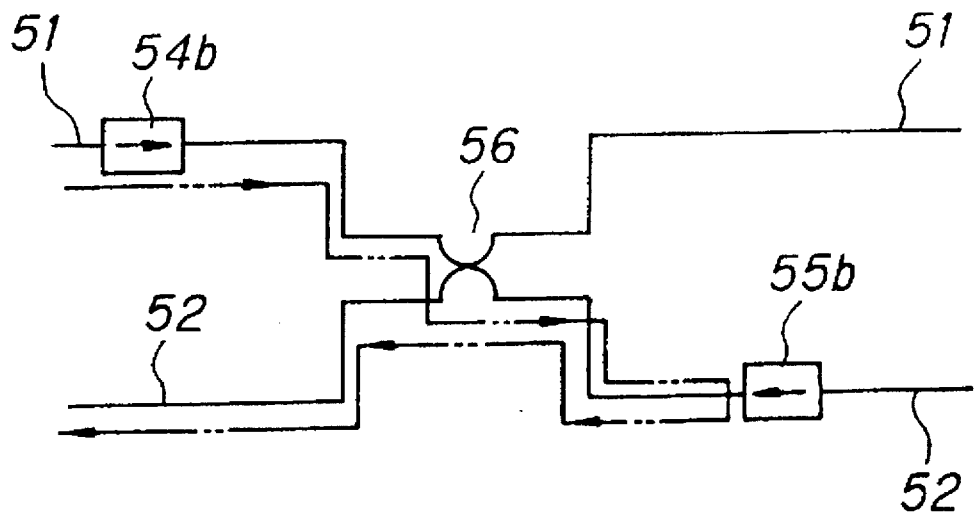
FIGS. 7A and 7B are diagrams for describing the operation of the third embodiment.

As indicated by the dot-and-dash line of FIG. 7A, the upward optical signal arrives at the optical isolator 55b of the downward direction upon being attenuated by 20 dB by the photocoupler 56, the optical signal is then attenuated by 20 dB and reflected by the isolator 55b, and the reflected light, which has been attenuated by a total of 40 dB, is looped back to the terminal station via the downward optical fiber 52. Similarly, the downward optical signal arrives at the optical isolator 54b of the upward direction upon being attenuated by 20 dB by the photocoupler 56, the optical signal is then attenuated by 20 dB and reflected by the isolator 54b, and the reflected light, which has been attenuated by a total of 40 dB, is looped back to the terminal station via the upward optical fiber 51. The terminal stations check the levels of the looped-back optical signals attenuated by 40 dB, thereby judging whether the optical amplifiers 54, 55 of repeater 53 are operating normally.

Figure 7B:
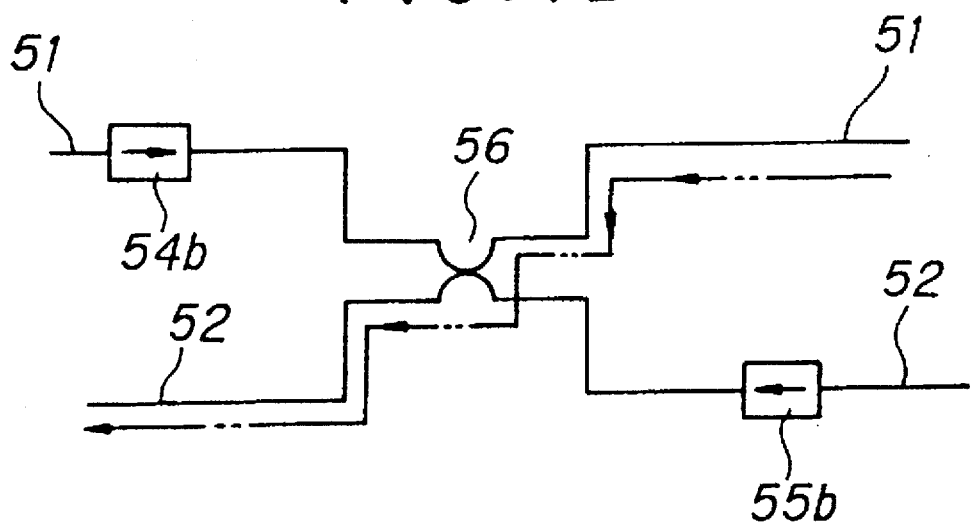

On the other hand, as indicated by the dot-and-dash line in FIG. 7B, Rayleigh scattered light scattered by the upward photocoupler 51 on the output side is attenuated by 20 dB by the photocoupler 56 and the attenuated optical signal is inserted into the downward optical fiber and returned to the terminal station. Similarly, Rayleigh scattered light scattered by the downward photocoupler 52 on the output side is inserted into the upward optical fiber 51 via the photocoupler 56 and is returned to the terminal station. Each terminal station monitors whether Rayleigh scattered light has returned. If Rayleigh scattered light cannot be detected a prescribed length of time after transmission of the optical signal, the terminal station is capable of detecting the location of the fault based upon the fact that the fault occurred at a location conforming to the elapsed time.

The foregoing is for a case in which the isolators 54b, 55b have been subjected to a reflective treatment. However, it is also possible to construct the optical repeater by providing a first reflector obtained by subjecting the output side (point A in FIG. 5) of the upward optical amplifier to a reflective treatment so as to transmit the upward light and but attenuate and reflect light that enters from the opposite direction, providing a second reflector obtained by subjecting the output side (point B in FIG. 5) of the downward optical amplifier to a reflective treatment so as to transmit the downward light and but attenuate and reflect light that enters from the opposite direction, and optically coupling, with a prescribed loss, the optical fiber on the reflecting side of the first reflector and the optical fiber on the reflecting side of the second reflector.

In accordance with this arrangement, the upward optical signal arrives at the second reflector of the downward direction upon being attenuated by 20 dB by a photocoupler, the optical signal is then attenuated by 20 dB and reflected by the second reflector, and the reflected light, which has been attenuated by a total of 40 dB, is returned to the terminal station via an optical fiber in the downward direction. Similarly, the downward optical signal arrives at the first reflector of the upward direction upon being attenuated by 20 dB by the photocoupler, the optical signal is then attenuated by 20 dB and reflected by the first reflector, and the reflected light, which has been attenuated by a total of 40 dB, is returned to the terminal station via an optical fiber in the upward direction. Further, light that has been scattered by the upward optical fiber on the output side is attenuated by 20 dB and inserted into the downward optical fiber by the photocoupler, and light that has been scattered by the downward optical fiber on the output side is inserted into the upward optical fiber by a photocoupler.

Thus, loop-back paths and OTDR paths can be formed merely by providing a single photocoupler. This makes it possible to lower the cost and raise the reliability of the optical repeater. Further, if the isolator 54b of the upward optical amplifier 54 is subjected to a reflective treatment to provide it with the reflection characteristic of the first reflector, the isolator 55b of the downward optical amplifier 55 is subjected to a reflective treatment to provide it with the reflection characteristic of the second reflector and the first and second reflectors are formed by these isolators, then separate first and second reflectors need not be provided and cost can be reduced correspondingly.

(D) Construction of Terminal Stations

Figure 8:
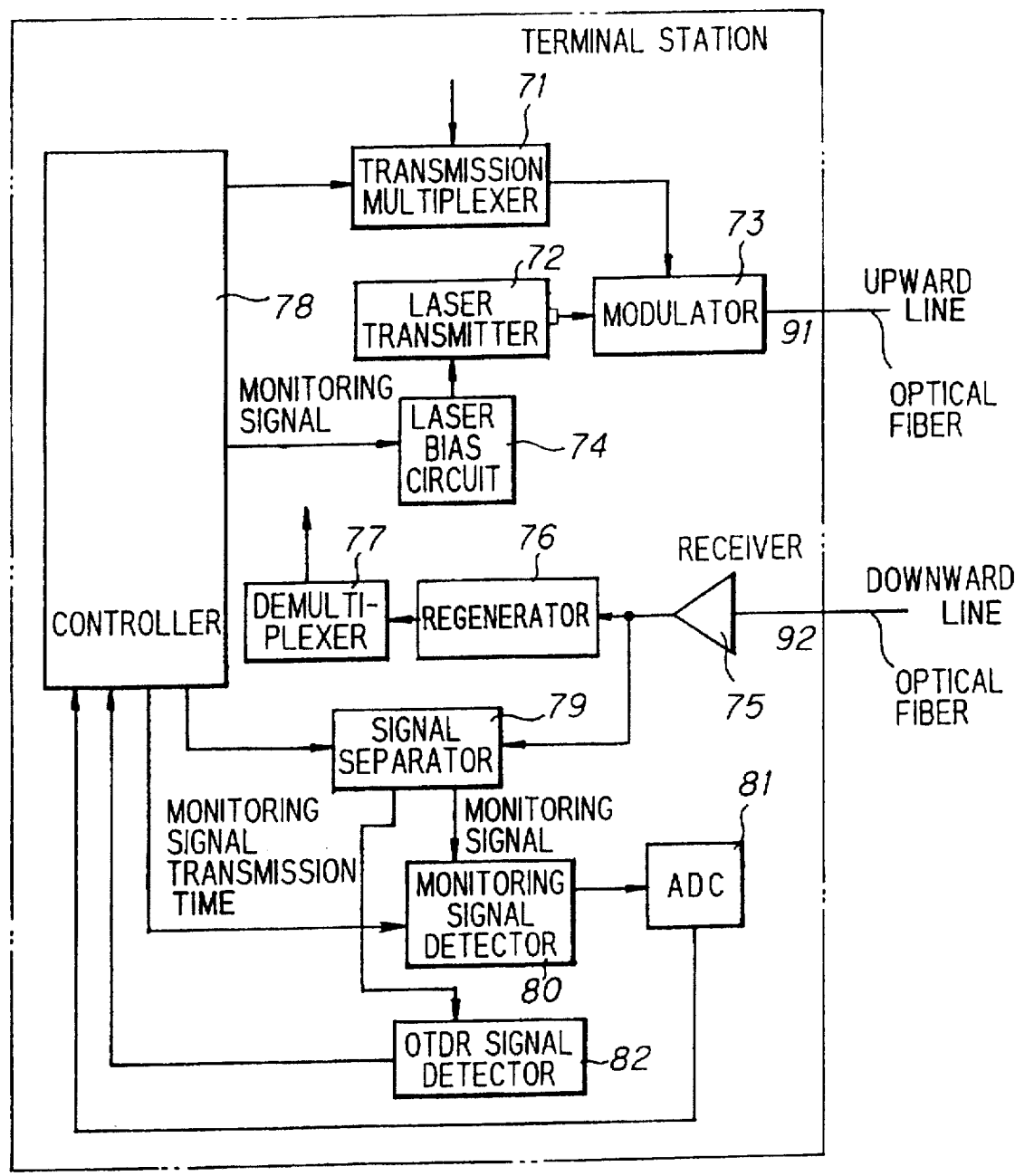
FIG. 8 is a diagram showing the construction of a terminal station.
Figure 9:
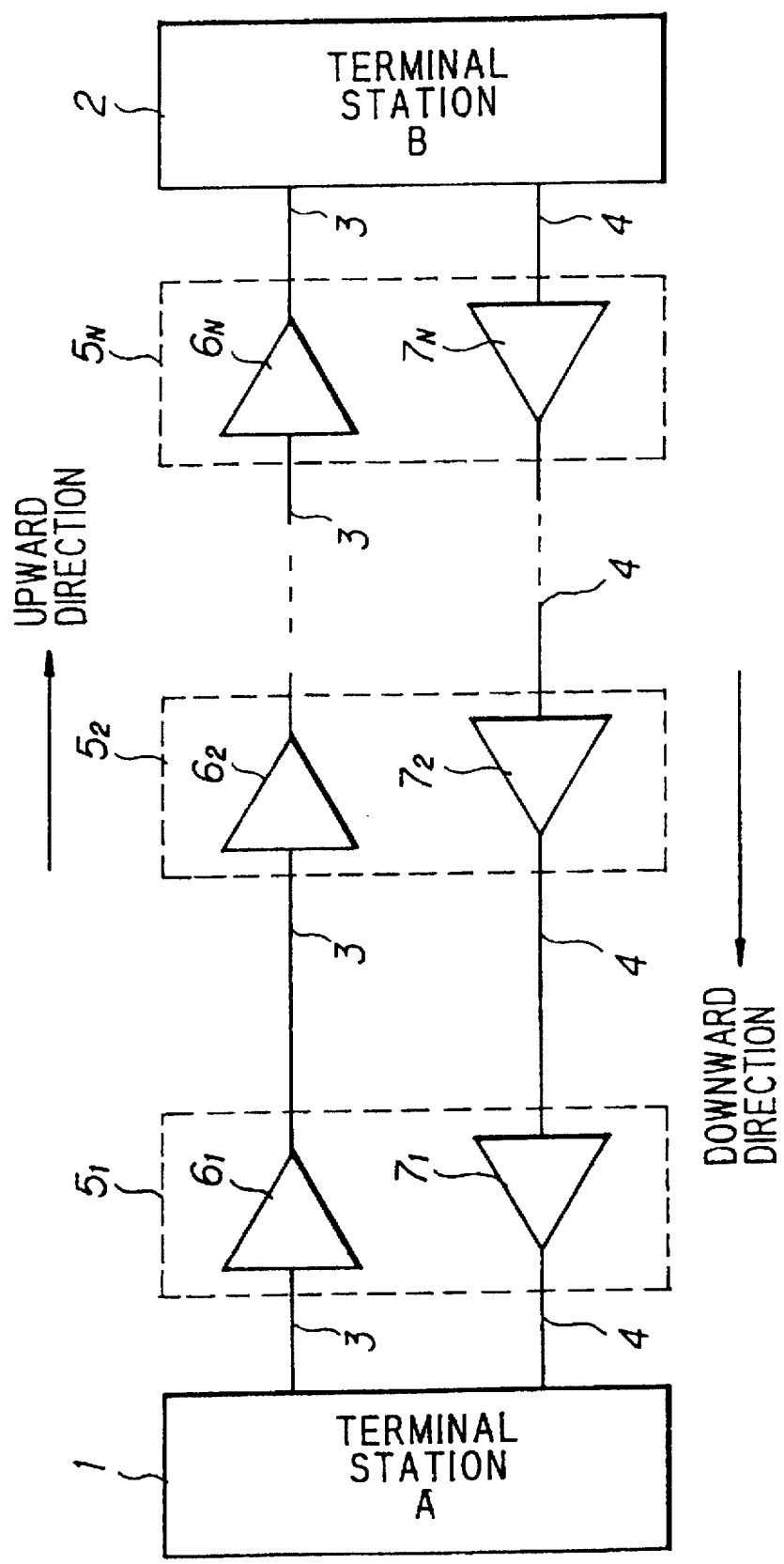
FIG. 9 is a diagram showing the construction of an optical transmission system.
Figure 10:
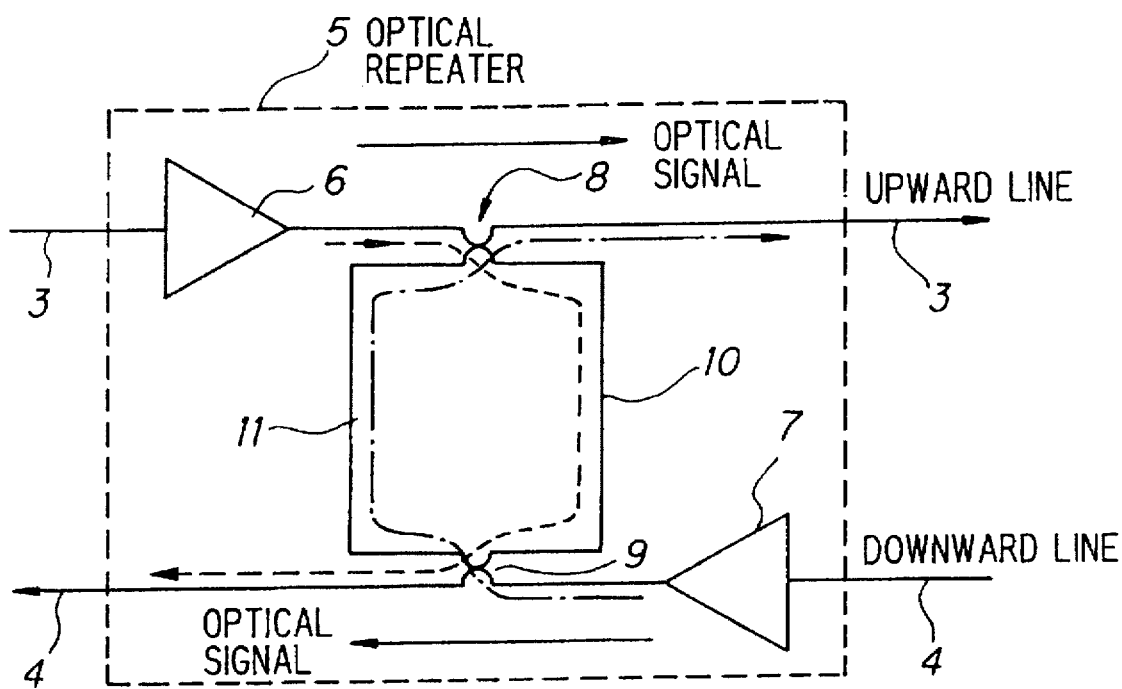
FIG. 10 is a diagram showing the construction of an optical repeater according to the prior art.
Figure 11:
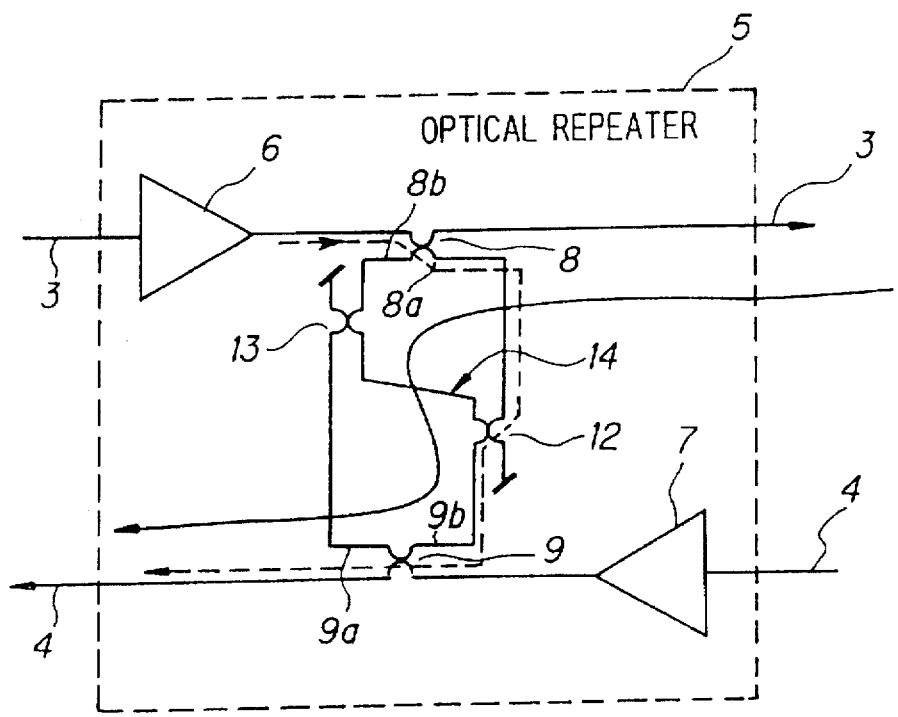
FIG. 11 is a diagram showing another construction of an optical repeater according to the prior art.
Figure 12:
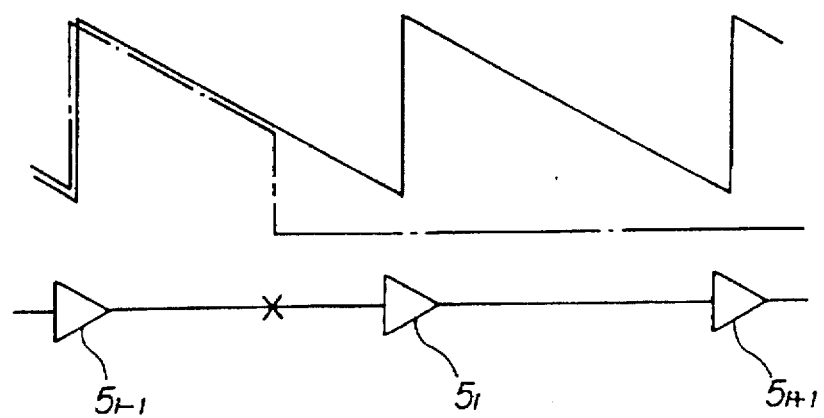
FIG. 12 is a diagram showing the relationship between Rayleigh reflected light and optical repeaters.

FIG. 8 is a diagram showing the construction of a terminal station. As shown in FIG. 8, the terminal station includes a transmission multiplexer 71 for multiplexing and outputting transmission information, a laser transmitter 72 for generating an optical carrier signal, a modulator 73 for modulating an optical carrier based upon the transmission and sending the modulated carrier to an upward optical fiber 91, a laser bias circuit 74 for controlling the intensity of the optical carrier, a receiver 75 for photoelectrically converting a looped-back signal as well as a signal from another terminal station transmitted by a downward optical fiber 92, a regenerator for reproducing the signal from the other terminal station, a demultiplexer 77 for demultiplexing and outputting the reproduced signal applied thereto, a controller 78 for overall control, a signal separator 79 for separating the looped-back signal (monitoring signal) and OTDR signal, a monitoring signal detector 80 for detecting and outputting a looped-back monitoring signal from an optical repeater, an AD converter 81 for A–D converting the level of the monitoring signal and outputting the resulting digital signal to the controller 78, and an OTDR signal detector 82 for detecting a fault location in a transmission line based upon absence/presence of the OTDR signal.

When the apparatus is in service, the controller 78 enters the monitoring signal into the laser bias circuit 74 which, on the basis of the monitoring signal, regulates a bias current to control the intensity of the optical signal. It should be noted that the monitoring data is sent upon being added onto the information outputted by the transmission multiplexer 71.

As described above, the monitoring signal returns to the terminal station upon being looped back and attenuated by 40 dB by each optical repeater. In a case where the monitoring signal has been sent from the terminal station, it is well known that the time required for the signal to return upon being looped back by an ith optical repeater of interest is proportional to the distance to this optical repeater. The signal separator 79 separates the monitoring signal from the optical main signal and enters the monitoring signal into the AD converter 81 at a time conforming to the ith optical repeater of interest. The AD converter 81 converts the level of the input monitoring signal to a digital signal and enters the digital signal into the controller 78. The controller 78 determines whether monitoring signal level is less than a set level. If the monitoring signal level is less than the set level, the controller 78 judges that the gain of the ith optical repeater is improper and outputs an alarm. If the transmission line up to the (i-1)th optical repeater is normal but the monitoring signal is not obtained at the ith optical repeater, the controller 78 outputs an alarm upon judging that a failure has occurred in the ith optical repeater or that a failure such as breakage of the optical fiber has occurred between the (1-i)th optical repeater and ith optical repeater.

If occurrence of failure is detected, it is required that the location of the failure be specified. In such case, service is suspended and the controller 78 sends a prescribed optical signal to the upward optical fiber 91. Thereafter, the OTDR signal detector 82 monitors the OTDR signal (the Rayleigh-scattering light signal) that returns via the downward optical fiber 92. When the OTDR can no longer be detected, the OTDR signal detector 82 so notifies the controller 78. The latter calculates the location of the failure from the time at which the signal was transmitted and the time at which the OTDR signal stopped being detected.

In accordance with the present invention, an optical fiber on the output side of an upward optical amplifier and an optical fiber on the output side of a downward optical amplifier are optically coupled, with application of a prescribed loss, by a photocoupler, and loop-pack paths are formed in such a manner that the upward optical signal is looped back to the optical fiber in the downward direction, upon being attenuated by, say, 40 dB, via the photocoupler, and the downward optical signal is looped back to the optical fiber in the upward direction, upon being attenuated by, say, 40 dB, via the photocoupler. As a result, a monitoring signal can be looped back merely by providing a single photocoupler. This makes it possible to lower the cost and raise the reliability of the optical repeater.

Further, in accordance with the present invention, the optical fiber on the output side of an upward optical amplifier in an optical repeater is provided with a first photocoupler having a prescribed optical coupling loss characteristic, and the optical fiber on the output side of a downward optical amplifier in the optical repeater is provided with a second photocoupler having a prescribed optical coupling loss characteristic. One ends of branch paths of the first and second photocouplers are each subjected to a reflective treatment so as to attenuate and reflect entrant light. Further, the other ends of the branch paths of the first and second photocouplers are coupled to form loop-back paths and OTDR paths. As a result, loop-back paths and OTDR paths can be formed merely by providing the two photocouplers. This makes it possible to lower the cost and raise the reliability of the optical repeater.

Further, in accordance with the present invention, an optical repeater can be constructed by subjecting the output side of an upward optical amplifier in an optical repeater to a reflective treatment so as to attenuate and reflect light that enters from the opposite direction, providing a second reflector obtained by subjecting the output side of a downward optical amplifier to a reflective treatment so as to attenuate and reflect light that enters from the opposite direction, and optically coupling, with a prescribed loss, the optical fiber on the reflecting side of the first reflector and the optical fiber on the reflecting side of the second reflector. As a result, the optical signal in one optical fiber can be entered into the reflectors of a pair of lines upon being attenuated by 20 dB by the photocoupler, and the reflected light that has been attenuated by 20 dB can be looped back to terminal stations via the pair of lines. Moreover, light scattered by one optical fiber on the output side can be entered into terminal stations via the optical fibers of a pair of lines upon being attenuated by 20 dB by the photocoupler. Therefore, in accordance with the present invention, loop-back paths and OTDR paths can be formed merely by providing a single photocoupler. This makes it possible to lower the cost and raise the reliability of the optical repeater. Further, if isolators are used to construct the reflectors, separate first and second reflectors need not be provided and cost can be reduced correspondingly.

As many apparently widely different embodiments of the present invention can be made without departing from the spirit and scope thereof, it is to be understood that the invention is not limited to the specific embodiments thereof except as defined in the appended claims.

What is claimed is:

1. An optical repeater provided between terminal stations for amplifying optical signals that have entered via respective ones of an optical fiber in an upward direction and an optical fiber in a downward direction and outputting the amplified optical signals to optical fibers in the respective directions, comprising:

a first photocoupler, which has a prescribed optical coupling loss characteristic, provided in an optical fiber on an output side of an optical amplifier of an upward direction;

a first reflector, which has a prescribed reflection loss characteristic, obtained by subjecting one end of a branch path of said first photocoupler to a reflective treatment;

a second photocoupler, which has a prescribed optical coupling loss characteristic, provided in an optical fiber on an output side of an optical amplifier in a downward direction;

a second reflector, which has a prescribed reflection loss characteristic, obtained by subjecting one end of a branch path of said second photocoupler to a reflective treatment; and an optical path for coupling another end of the branch path of said first photocoupler and another end of the branch path of said second photocoupler.

2. The optical repeater according to claim 1, further comprising:

a loop-back path for reflecting the optical signal of the upward direction by introducing said optical signal to said first reflector via said first photocoupler and looping back the reflected optical signal to the optical fiber of the downward direction via said optical path and said second photocoupler, and reflecting the optical signal of the downward direction by introducing said optical signal to said second reflector via said second photocoupler and looping back the reflected optical signal to the optical fiber of the upward direction via said optical path and said first photocoupler; and a fault-point detection path for inserting scattered light, which has been scattered by the optical fiber of the upward direction on the output side, into the optical fiber of the downward direction via said first photocoupler, said optical path and said second photocoupler in succession, and inserting scattered light, which has been scattered by the optical fiber of the downward direction on the output side, into the optical fiber of the upward direction via said second photocoupler, said optical path and said first photocoupler in succession.

3. An optical repeater provided between terminal stations for amplifying optical signals that have entered via respective ones of an optical fiber in an upward direction and an optical fiber in a downward direction and outputting the amplified optical signals to optical fibers in the respective directions, comprising:

a first reflector, provided on an output side of an optical amplifier which amplifies an optical signal of an upward direction, obtained by applying a reflective treatment so as to attenuate and reflect an optical signal that has entered from the opposite direction;

a second reflector, provided on an output side of an optical amplifier which amplifies an optical signal of a downward direction, obtained by applying a reflective treatment so as to attenuate and reflect an optical signal that has entered from the opposite direction; and a single photocoupler, which has a prescribed optical coupling loss characteristic, for optically coupling an optical fiber on a reflecting side of said first reflector and an optical fiber on a reflecting side of said second reflector.

4. The optical repeater according to claim 3, further comprising:

a loop-back path for introducing the optical signal of the upward direction to said second reflector of the downward direction via said photocoupler and returning the reflected optical signal in said second reflector to a terminal station via the optical fiber of the downward direction, and introducing the optical signal of the downward direction to said first reflector of the upward direction via said photocoupler and returning the reflected optical signal in said first reflector to a terminal station via the optical fiber of the upward direction; and a fault-point detection path for inserting scattered light, which has been scattered by the optical fiber of the upward direction on the output side, into the optical fiber of the downward direction via said photocoupler, and inserting scattered light, which has been scattered by the optical fiber of the downward direction on the output side, into the optical fiber of the upward direction via said photocoupler.

5. The optical repeater according to claim 3, wherein an isolator which passes an optical signal only in the upward direction is provided on the output side of the optical amplifier of the upward direction, said isolator is subjected to a reflective treatment to provide it with a reflection characteristic possessed by said first reflector, an isolator which passes an optical signal only in the downward direction is provided on the output side of the optical amplifier of the downward direction, said isolator is subjected to a reflective treatment to provide it with a reflection characteristic possessed by said second reflector, and said first and second reflectors are constructed by said isolators.

* * * * *